(12) United States Patent
O'Donohue

(10) Patent No.: US 9,675,145 B2
(45) Date of Patent: Jun. 13, 2017

(54) CRUTCH HOLDER

(76) Inventor: Beau O'Donohue, Lake Wendouree (AU)

( * ) Notice: Subject to any disclaimer, the term of this patent is extended or adjusted under 35 U.S.C. 154(b) by 0 days.

(21) Appl. No.: 13/996,785

(22) PCT Filed: Dec. 21, 2011

(86) PCT No.: PCT/AU2011/001658
§ 371 (c)(1),
(2), (4) Date: Jul. 1, 2013

(87) PCT Pub. No.: WO2012/083367
PCT Pub. Date: Jun. 28, 2012

(65) Prior Publication Data
US 2013/0292534 A1    Nov. 7, 2013

Related U.S. Application Data

(60) Provisional application No. 61/484,426, filed on May 10, 2011.

(30) Foreign Application Priority Data

Dec. 22, 2010    (AU) .................................. 2010905602

(51) Int. Cl.
*A45B 1/00*    (2006.01)
*F16M 11/00*    (2006.01)
(Continued)

(52) U.S. Cl.
CPC ............... *A45B 1/00* (2013.01); *A47G 25/12* (2013.01); *A61H 3/0244* (2013.01); *F16M 11/00* (2013.01)

(58) Field of Classification Search
CPC ............ A61H 3/0244; A61H 2003/025; A61H 2003/0255; A61H 2003/0261; F16M 11/00; A47G 25/12; A47G 33/1206; A45B 1/00; B60N 3/106; E04H 12/2238; B25B 1/04; B25B 1/18; B25B 5/122; B25B 27/026; B25B 13/5041; B25B 5/04; F16B 2/10
(Continued)

(56) References Cited

U.S. PATENT DOCUMENTS 1,351,007 A    8/1920  Shephard
1,720,115 A *  7/1929  Barnes ........................... 211/14
(Continued)

FOREIGN PATENT DOCUMENTS

| DE | 449318 C | 9/1927 | |
| DE | 19729689 A1 * | 1/1999 | ............. A47G 23/02 |
| FR | 2775755 A1 | 9/1999 | |

OTHER PUBLICATIONS

International Search Report for PCT/AU2011/001658, mailed Mar. 15, 2012; ISA/AU.

*Primary Examiner* — Ingrid M Weinhold
(74) *Attorney, Agent, or Firm* — Go Foward Co.; Beau O'Donohue

(57) ABSTRACT

In one preferred form of the present invention there is provided a crutch holder 10 for holding a crutch 12. The crutch holder 10 comprises a body 14 providing a cavity 16 for receiving an end 18 of the crutch 12. A plurality of holding elements 22 are movably mounted relative to the body 14 and adapted to move from a first position 24 to a second position 26 in response to the end 18 being received so as to assist with maintaining the crutch 20 in an upright position.

18 Claims, 12 Drawing Sheets

(51) Int. Cl.
*A47G 25/12* (2006.01)
*A61H 3/02* (2006.01)

(58) Field of Classification Search
USPC ........ 248/519, 523–526, 346.04, 311.2, 313,
248/154; 211/62; 47/40.5
See application file for complete search history.

(56) References Cited

U.S. PATENT DOCUMENTS

| | | | | |
|---|---|---|---|---|
| 1,876,276 | A * | 9/1932 | Danner | 47/40.5 |
| 1,898,669 | A * | 2/1933 | Knudson | 248/526 |
| 2,028,129 | A * | 1/1936 | Allerton | 47/40.5 |
| 2,504,455 | A * | 4/1950 | Ruetz | 47/40.5 |
| 3,693,918 | A * | 9/1972 | Fisher et al. | 47/40.5 |
| 5,114,113 | A * | 5/1992 | Krinner | 248/525 |
| 5,154,380 | A * | 10/1992 | Risca | 248/154 |
| 5,464,186 | A * | 11/1995 | Robert | 248/524 |
| 5,639,055 | A * | 6/1997 | Fritz | 248/519 |
| 5,839,711 | A * | 11/1998 | Bieck et al. | 248/313 |
| 6,419,202 | B1 * | 7/2002 | Thurner | 248/525 |
| 6,572,069 | B1 * | 6/2003 | Kotthaus | 248/523 |
| 6,854,700 | B2 * | 2/2005 | Schmitz | 248/523 |
| 6,877,708 | B1 * | 4/2005 | Thurner | 248/519 |
| 6,988,702 | B2 * | 1/2006 | Schulz | 248/525 |
| 7,360,548 | B1 | 4/2008 | Hinca | |
| 8,353,495 | B2 * | 1/2013 | Ogura | 248/311.2 |
| 2003/0146362 | A1 * | 8/2003 | Oetiker et al. | 248/346.03 |
| 2004/0099782 | A1 * | 5/2004 | Schulz | 248/346.06 |
| 2005/0274862 | A1 * | 12/2005 | Takeichi | 248/311.2 |
| 2006/0186305 | A1 * | 8/2006 | Krinner | 248/523 |
| 2007/0257179 | A1 * | 11/2007 | Thurner et al. | 248/523 |
| 2012/0102830 | A1 * | 5/2012 | Bard et al. | 47/40.5 |

* cited by examiner

CRUTCH HOLDER

CROSS-REFERENCE TO RELATED APPLICATIONS

This application is a 371 U.S. National Stage of International Application No. PCT/AU2011/001658, filed Dec. 21, 2011, and claims priority to Australian Patent Application No. 2010905602, filed Dec. 22, 2010, and the benefit of U.S. Provisional Application No. 61/484,426 filed May 10, 2011, the disclosures of which are herein incorporated by reference in their entirety.

FIELD

The present disclosure relates to crutch holders and methods.

BACKGROUND

It would be appreciated that this invention relates to many different types of crutches or aids that assist in supporting a person from otherwise falling or collapsing. The invention will be discussed with specific reference to crutches, however it will be appreciated that there are a number of combinations of supports, such as a pair of crutches, walking canes or a single crutch.

A crutch holder general comprises a base that supports a hollow vertically extending cylinder for receiving one or more crutches. In order to provide sufficient support, the cylinder typically extends into the air and has a cross section that is suited to retaining the crutch or crutches in an upright position.

It is against this background and the problems and difficulties associated therewith that the present invention has been developed.

SUMMARY

According to a first aspect of preferred embodiments herein described there is provided a crutch holder comprising: a body providing a cavity for receiving an end of a crutch; and a plurality of holding elements movably mounted relative to the body and adapted to move from a first position to a second position in response to the end of the crutch being received by the cavity so as to assist with maintaining the crutch in an upright position.

Preferably the holding elements include a first portion for engaging the end of the crutch and a second portion for engaging the crutch a predetermined distance away from the end of the crutch.

Preferably the holding elements are pivotally mounted such that tipping in the direction of one of the holding elements causes movement of the second portion of the holding element to force the first portion of the holding element to move in an opposite direction to bring the first portion into increased engagement with the end of the crutch and result in an increased holding force.

Preferably each holding element provides a pivot lever for compressing the end of the crutch as the crutch is tipped, the cavity being adapted to provide an abutment to hold the end of the crutch in position to allow for the compressing action of each pivot lever.

Preferably each holding element is pivotally mounted to the body adjacent the periphery of the cavity so as to be rotatable from the first position to a vertically extending position.

Preferably the holding elements are adapted to move back to the first position when the crutch is lifted vertically out of the cavity.

Preferably the holding elements are counterweighted so as to be biased towards the first position.

Preferably the cavity includes slot portions for receiving the holding elements to provide what is effectively a cavity of a substantially circular cross section.

Preferably a first pair of the holding elements is arranged for preventing rotation of the crutch in a first plane; and a second pair of the holding elements is arranged for preventing rotation of the crutch in a second plane; the second plane being substantially perpendicular to the first plane.

According to a second aspect of preferred embodiments herein described there is provided a method of holding a crutch comprising: receiving an end of crutch within a cavity; wherein movement of the crutch into the cavity causes the crutch to bear against a plurality of holding elements and move the holding elements from a first position to a second position in which the holding elements assist with maintaining the crutch in an upright position.

Preferably each of the holding elements is arranged to extend upwardly when holding the crutch so as to increase the effective depth of the cavity as seen by the crutch.

According to a third aspect of preferred embodiments herein described there is provided a holder for a rod element comprising: a cavity for receiving an end of the rod element; and a plurality of holding elements adapted to move from a first position to a second position as the cavity receives the rod element so as to assist with maintaining the rod element in an upright position when received by the cavity.

Preferably each of the holding elements is arranged to extend upwardly when holding the rod element so as to increase the effective depth of the cavity as seen by the rod element.

As will be discussed there are considered to be a number of preferred arrangements of the present invention that provide several advantages including:

(i) Crutch holders that provide advantageous holding mechanisms;

(ii) Crutch holders that are readily able to be used and which provide people who require crutches with more independence in domestic, hospital and other environments;

(iii) Crutch holders that have an aesthetically pleasing profile and that allow for ready insertion and removal of crutches; and (iv) Crutch holders that while providing an advantageous holding mechanism are still readily manufactured with a relatively low number of parts.

It is to be recognised that other aspects, preferred forms and advantages of the present invention will be apparent from the present specification including the detailed description, drawings and claims.

BRIEF DESCRIPTION OF THE DRAWINGS

In order to facilitate a better understanding of the present invention, several preferred embodiments will now be described with reference to the accompanying drawings, in which.

DETAILED DESCRIPTION

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
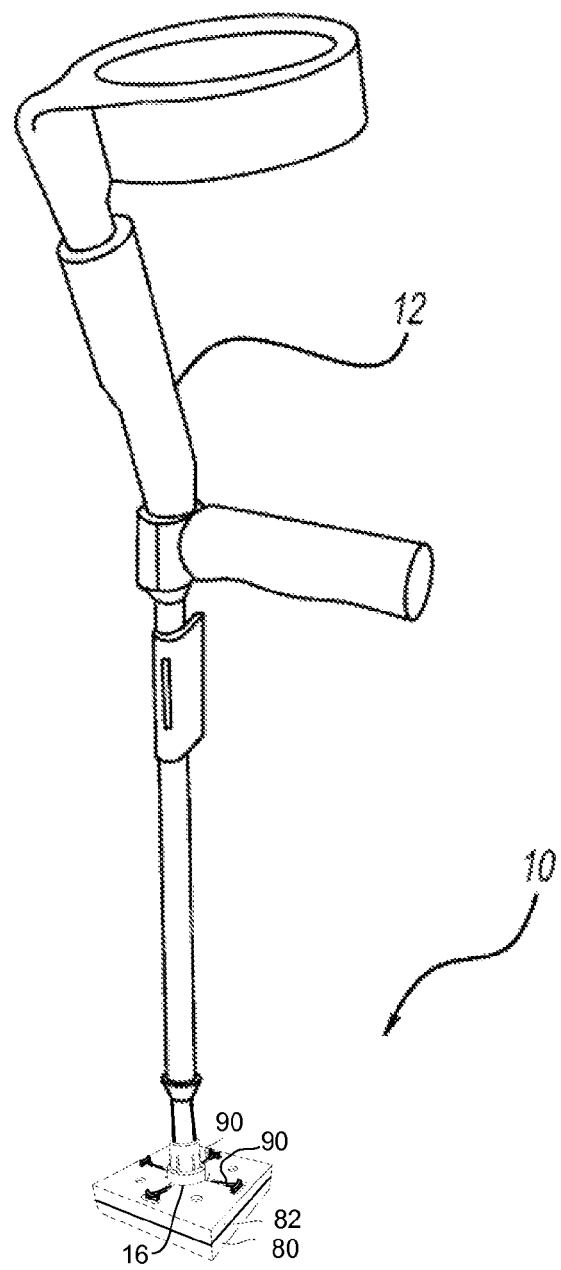
FIG. 1 provides a perspective view of a crutch holder according to a first preferred embodiment of the present invention.

Referring to FIG. 1, there is shown a crutch holder 10 according to a first preferred embodiment of the present invention. The crutch holder 10 has a relatively low profile that allows for ready insertion and removal of a crutch 12 and provides a holding mechanism that advantageously holds the crutch 12 in an upright position.

The crutch holder 10 is considered to provide a stand that can advantageously be used in hospital rooms next to beds or chairs, bathrooms, rehabilitation rooms and gyms, waiting rooms and so forth. It is considered that the crutch holder 10 will reduce the difficulty of retrieving crutches in both domestic and hospital environments. The crutch holder 10 is considered to advantageously provide people who require crutches with more independence.

As shown in FIGS. 1 and 2, the crutch holder 10 comprises a body 14 providing a cavity 16 for receiving an end 18 of the crutch 12. A plurality of holding elements 22 are movably mounted relative to the body 14. The holding elements 22 are adapted to move from a first position 24 to a second position 26 in response to the end 18 of the crutch 12 being received so as to assist with maintaining the crutch 20 in an upright position.

In the first position 24, the holding elements 22 extend in a generally horizontal direction in which a first portion 28 of each holding element 22 extends over the cavity 16 and a second portion 30 of each holding element 22 is spaced away from the cavity 16.

The first portions 28 are adapted to engage the lower face 32 of the end 18 of the crutch 12 as the crutch 12 is inserted into the cavity 16. The first portions 28 include a number of projecting portions 34 that extend laterally away from the length of each respective holding element 22. As the crutch 12 is further inserted into the cavity 16, the projecting portions 34 bear against the lower face 32 of the end 18 of the crutch 12. As the crutch 12 and the lower face 32 thereof is inserted into the cavity 16, the projecting portions 34 move outwardly along the lower face 32.

As the end 18 of the crutch 12 continues to be inserted, the projecting portions 34 are brought to an edge 36 of the end 18 of the crutch 12. Further insertion causes the first portions 28 to subsequently move past the edge 36 and bear against the sides 38 of the end 18 of the crutch 12. As the end 18 of the crutch 12 is fully pushed into the cavity 16 the projecting portions 34 bear against and slightly compresses the sides 38 of the end 18 so as to hold the crutch 12 in position.

Figure 2A:
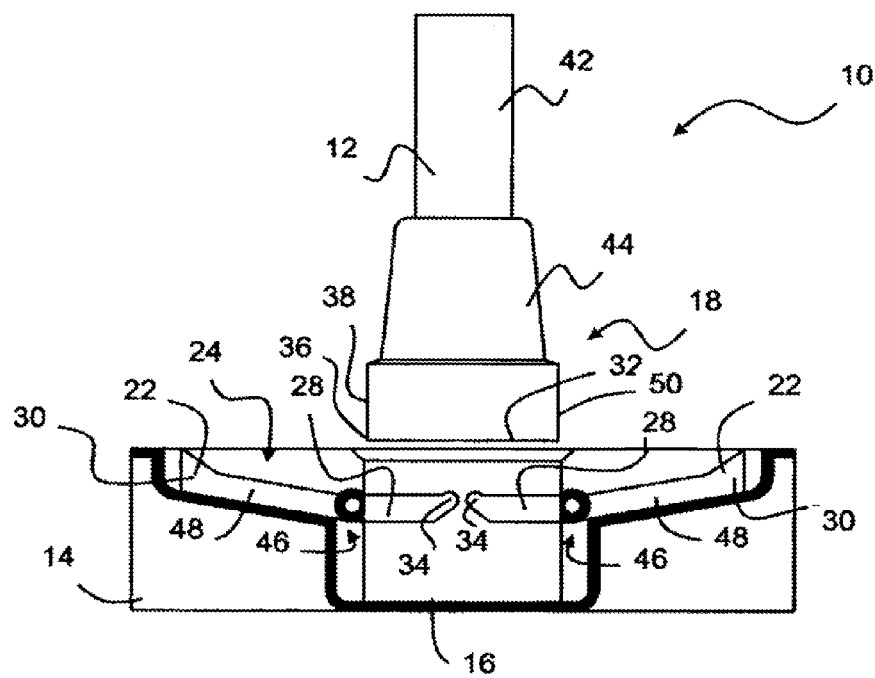
FIGS. 2a and 2b provide two cross-sectional views of the crutch holder shown in FIG. 1.
Figure 2B:
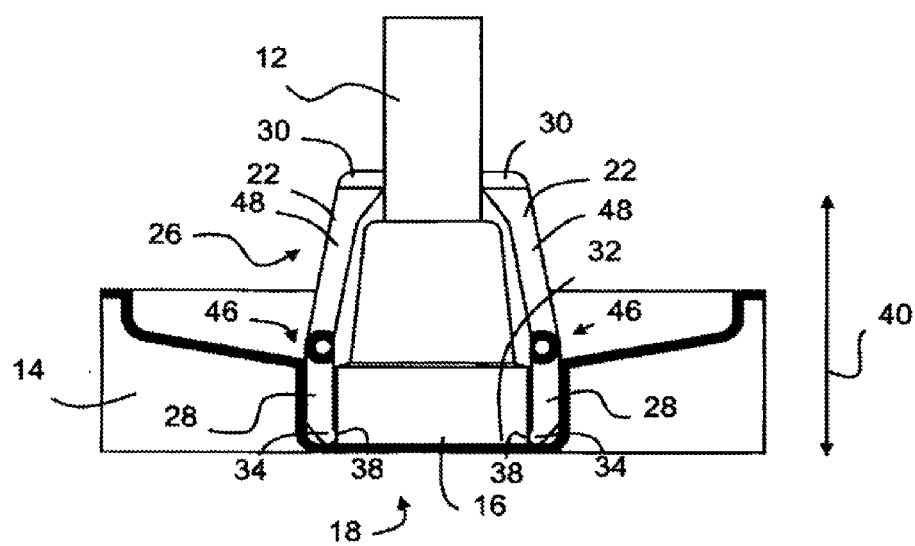

When holding the crutch 12 in position, the second portions 30 of each holding element 22, engage the crutch 12 a predetermined distance 40 away from the end 18 of the crutch 12. As shown in FIGS. 2a and 2b, the second portions 30 are adapted to engage the aluminium rod portion 42 of the crutch 12 above a rubber tip 44 provided at the end 18.

In the embodiment, each holding element 22 is pivotally mounted to the body 14 at locations 46 between the respective first portions 28 and the second portions 30 of each holding element 22. The pivotal mounting is considered to be advantageous due to the holding elements 22 consequently each providing a pivot lever 48 for compressing the outer rim 50 (the sides 38) of the rubber tip 44 of the crutch 12, as the crutch is tipped forwards or backwards.

Figure 3:
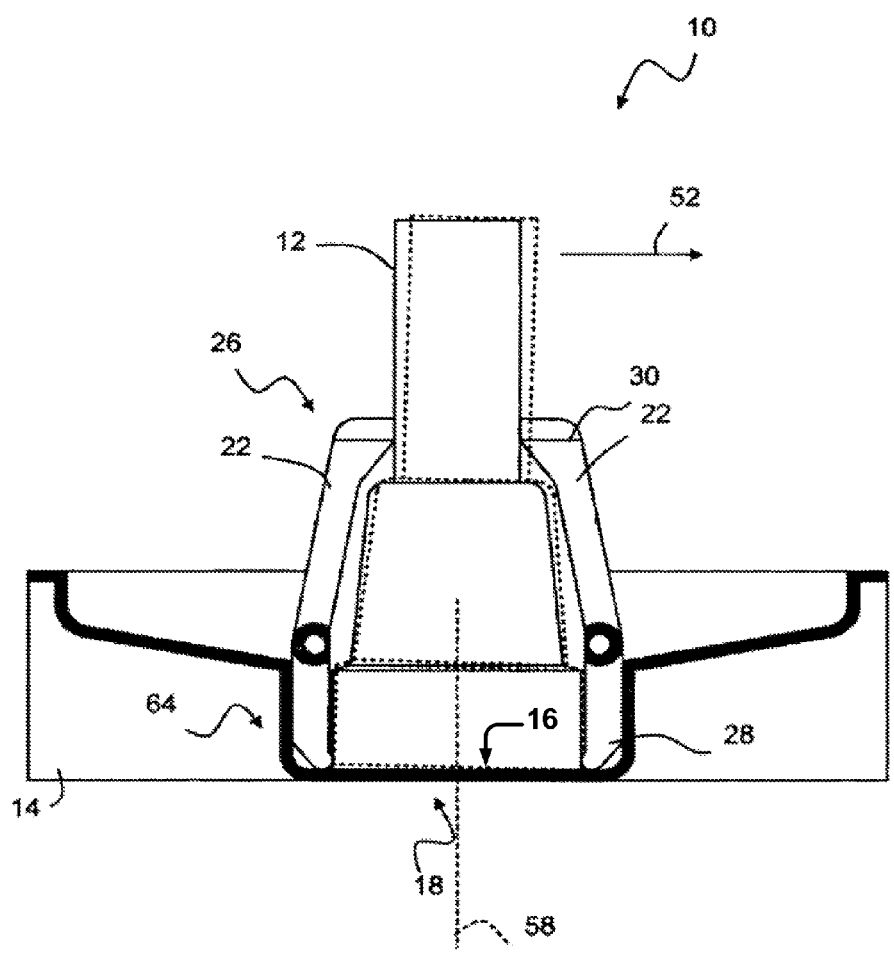
FIG. 3 provides a single cross-sectional view of the crutch holder shown in FIG. 1.

As shown in FIG. 3, tipping in direction 52 towards one of the holding elements 22 causes the second portion 30 of the holding element 22 to move away from the central axis 58 of the cavity 16. This forces the first portion 28 of the holding element 22 to move in an opposite direction, towards the central axis 58 of the cavity 16. This advantageously serves to bring the first portion 28 into increased engagement with the outer rim 50 of the crutch 12 and result in an increased holding force.

It is to be appreciated that, in order to provide the increased holding force, the opposite holding element 22 and the surrounding walls of the cavity 16 provide an abutment 64 that holds the end 18 of the crutch 12 (to provide an opposite force) so that the holding element 22 is able to act to provide the increased holding force.

Figure 4:
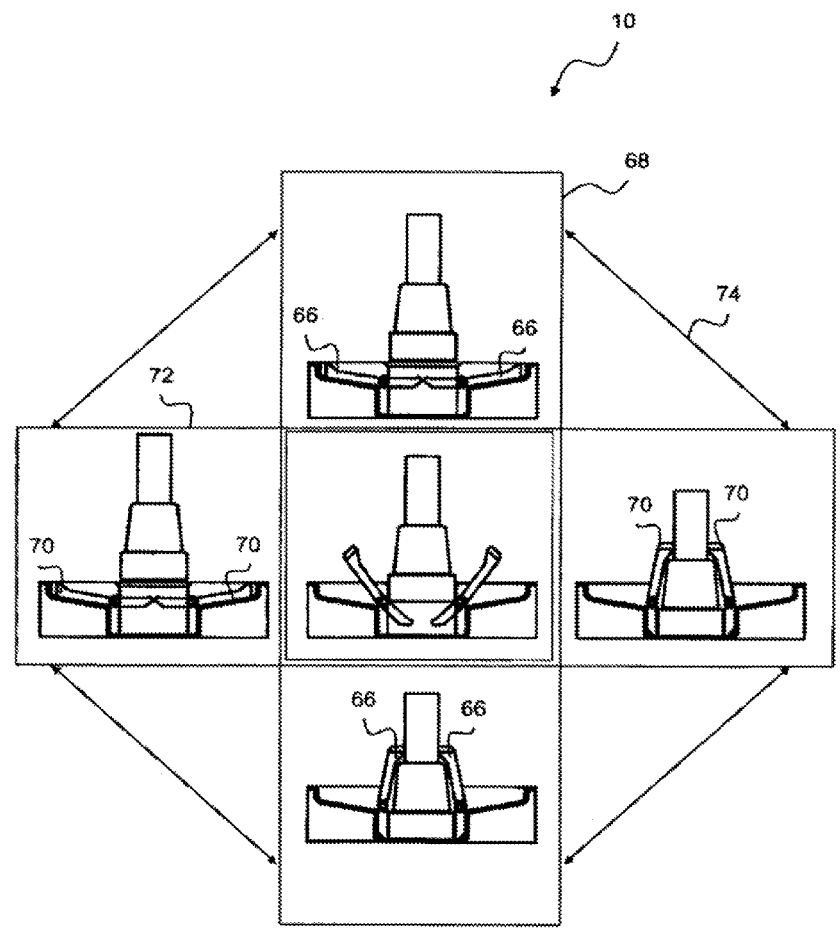
FIG. 4 provides several cross-sectional views of the crutch holder shown in FIG. 1, the views serving to illustrate the operation of the crutch holder.
Figure 5:
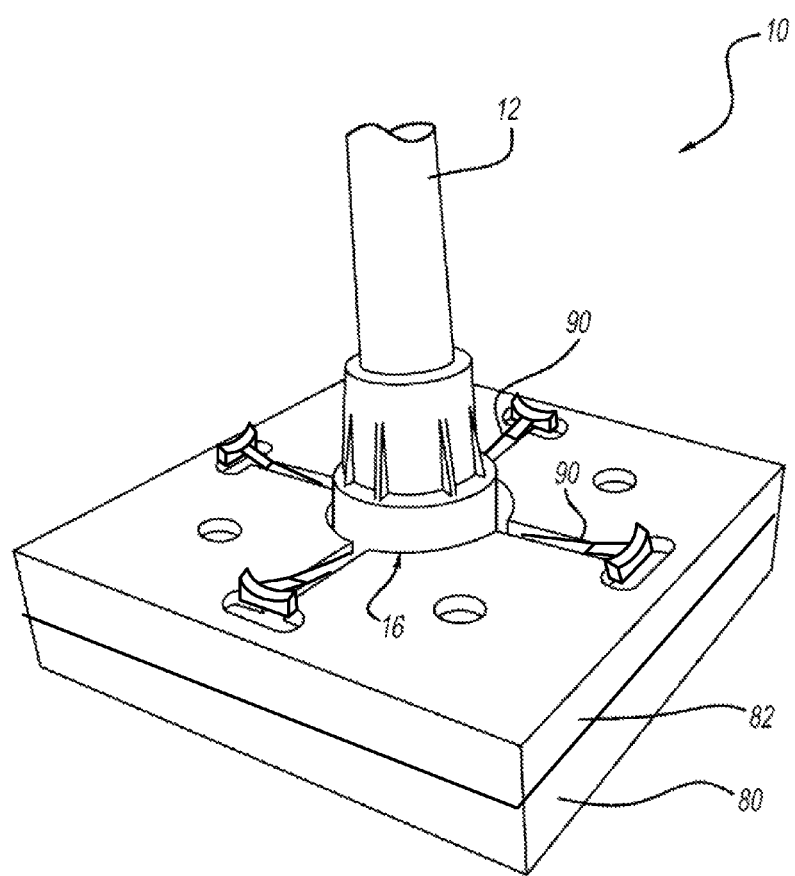
FIG. 5 provides a perspective view of the crutch holder shown in FIG. 1, just before a crutch is inserted into the crutch holder.
Figure 6:
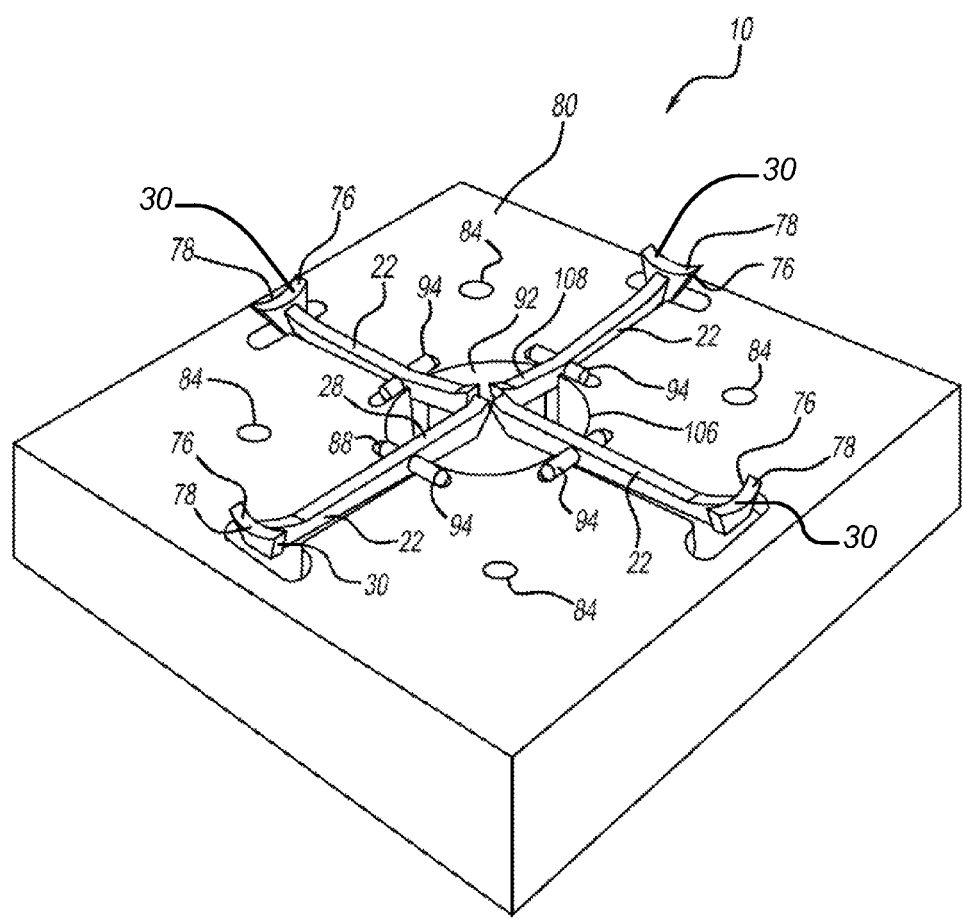
FIG. 6 provides a partially dismantled view of the crutch holder shown in FIG. 1.

As shown in FIGS. 4 to 6, the crutch holder 10 includes a first pair 66 of the holding elements 22 disposed in a first plane 68 for preventing rotation of the crutch 12 in that plane. The crutch holder 10 further includes a second pair 70 of the holding elements 22 arranged in a second plane 72 that is substantially perpendicular to the first plane 68, for preventing rotation of the crutch 12 in the second plane 72.

Advantageously by providing the first pair 66 of the holding elements 22, the crutch holder 10 is able to advantageously assist with preventing tipping in both a forward and reverse direction in the first plane 68. Similarly, by providing the second pair 70 of the holding elements 22, the crutch holder 10 is able to advantageously assist with preventing tipping in both a forward and reverse direction in the second plane 72. In the vertical planes 74 located between the first plane 68 and the second plane 72 the components of the tipping action provided by tipping the crutch 12 are shared between the first plane 68 and the second plane 72 such that the first pair 66 and the second pair 70 of the holding elements 22 cooperate to prevent tipping of the crutch 12.

As shown in FIG. 6, the first portions 28 advantageously include laterally extending portions 76 that cause the holding elements 22 to move when the crutch 12 is tipped in any direction with the first pair 66 and the second pair 70 of the holding elements 22 cooperating to prevent tipping.

The laterally extending portions 76 include concave portions 78 that neatly fit around the aluminium rod portion 42 of the crutch 12. Advantageously the concave portions 78 of the holding elements 22 extend around a substantial portion of the circumference of the rod portion 42.

Referring to FIGS. 5 and 6, the body 14 of the crutch holder 10 comprises a first portion 80 and a second portion 82. The second portion 82 includes a plurality of holes for receiving fasteners that extend through the second portion 82 into the first portion 80. The first portion 80 includes a plurality of fastening holes 84 having corresponding internal threaded portions for securing the fasteners. The first portion 80 and the second portion 82 define mounting portions 88 in the form of grooves for pivotally mounting the holding elements 22.

The holding elements 22 are able to be positioned on the first portion 80, and the second portion 82 is able to be brought into engagement with the first portion 80 and secured using the fasteners so as to mount the holding elements 22 in position, with the holding elements 22 being pivotally mounted to the body 14 by the grooves.

As shown in FIG. 5, the first portion 80 includes two slots 90 extending across the cavity 16 for allowing the holding elements 22 to extend upwardly to hold the crutch 12. The slots 90 are arranged to form a cruciform configuration through which the holding elements 22 are able to extend upwardly.

The mounting portions 88 are spaced outside the periphery 92 of the cavity 16 so as to be able to hold a pivot portion 94 extending from each holding element 22. As shown in FIG. 6, the pivot portions 94 comprise extensions that extend laterally away from the body of each holding element 22. The pivot portions 94 are advantageously spaced further away from the end of the first portion 28 than the end of the second portion 30. The spacing of pivot portions 94 advantageously serves, when the crutch 12 is removed from the crutch holder 10, to bias the holding elements 22 to move from a vertically extending position to the first position 24. This is described in further detail below with reference to FIGS. 7a and 7b.

Figure 7A:
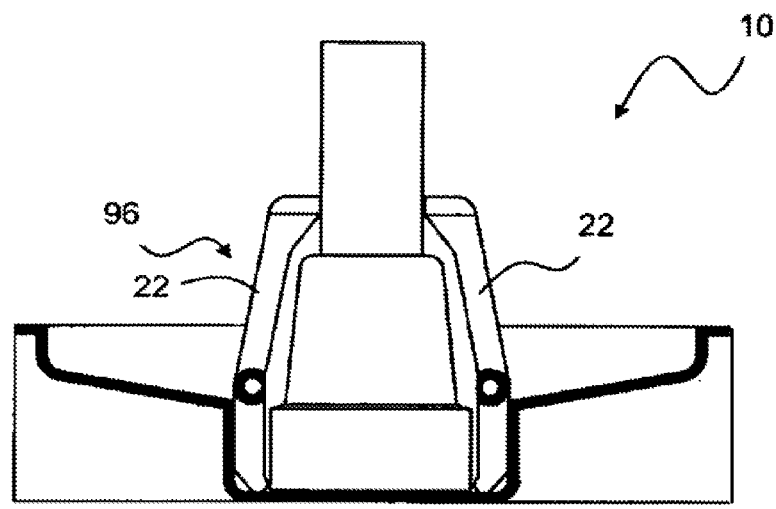
FIGS. 7a and 7b provide two cross-sectional views of the crutch holder shown in FIG. 1.
Figure 7B:
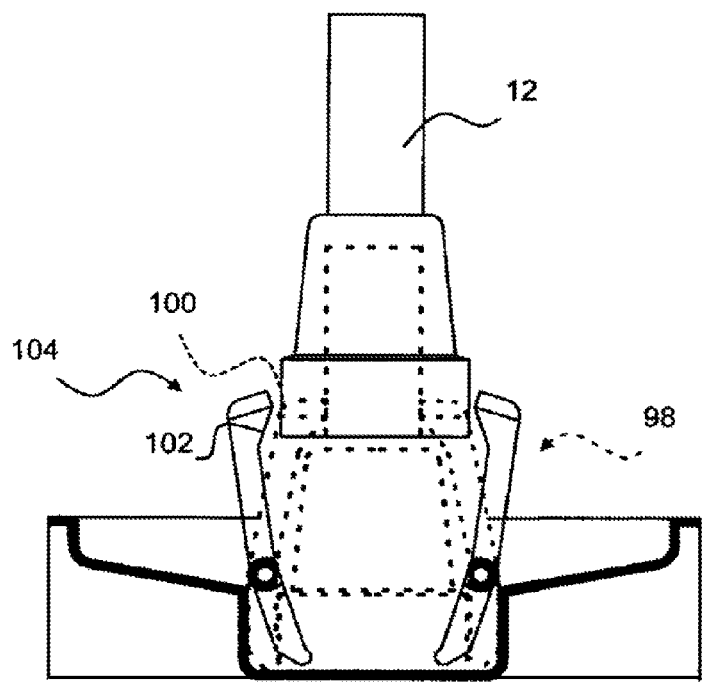

The removal of the crutch 12 from the crutch holder 10 is illustrated in FIGS. 7a and 7b. Initially, the crutch 12 starts off in a received position 96. Following this the crutch 12 is lifted upwardly to a position 98 at which point the shoulder 100 of the rubber tip 44 of the crutch 12 bears against inclined portions 102 of the holding elements 22. This causes all the holding elements 22 to move outwardly such that their centres of mass moves beyond the pivot fulcrum provided by pivot portions 94 such that the holding elements 22 move away from the vertically extending position 104 and fall back towards the retracted first position 24 shown in FIGS. 2a and 2b. Thus by controlling the position of the pivot portions 94 and the centres of mass, the holding elements 22 are counterweighted so as to be biased towards the first position 24 when the crutch 12 is lifted vertically out of the cavity 16. As would be apparent this is advantageous for the reason that the holding mechanism of the crutch holder 10 does not have to be manually reset. The crutch holder 10 is advantageously adapted to automatically move the holding elements 22 back to the first position 24 on removal of the crutch 12.

As shown in FIG. 6, the walls of the cavity include two slot portions 106 for receiving the first portions 28 of the holding elements 22 when the crutch 12 is held in the upright position. The slot portions 106 are shaped such that when the crutch 12 is held in the upright position the surfaces 108 of the first portions 28 of the holding elements 22 and the cavity 16 form an effective cavity of substantially circular cross section, as seen by the crutch 12. This advantageously serves to assist with providing an abutment when the crutch 12 is tipped so as to allow for the compressing action of the respective holding elements 22 which act as pivot levers.

As would be apparent, the second portions 30 are biased towards the central axis 58 of the cavity 16 (the longitudinal axis 110 of the crutch 12) when holding the crutch 12 due to the centers of mass of the holding elements 22 being spaced inwardly from the pivot provided by the pivot portions 94.

As discussed the second portions 30 of each holding element 22 are arranged for holding the crutch 12 above the shoulder the rubber tip 44 at the end 18 of the crutch 12. In order to readily accommodate a conventional rubber tip end the holding elements 22 are, in this embodiment, of a length of about 67 cm. Such a length advantageously serves to hold conventional crutches as well to provide a base of convenient size. The base is of course weighted by known means.

Figure 8A:
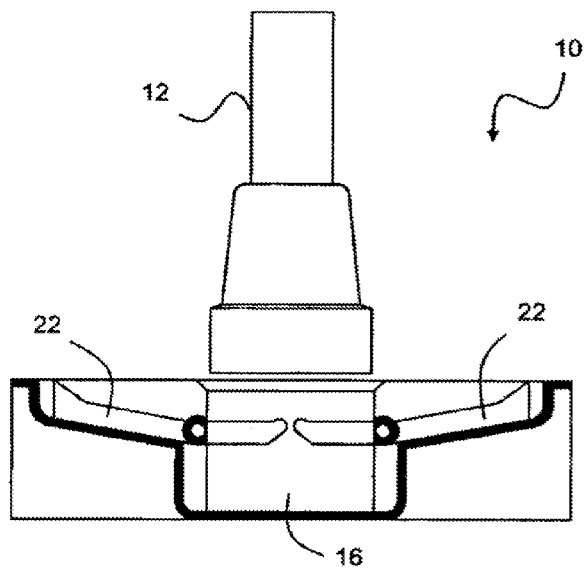
FIGS. 8a and 8b provide two further cross-sectional views of the crutch holder shown in FIG. 1.
Figure 8B:
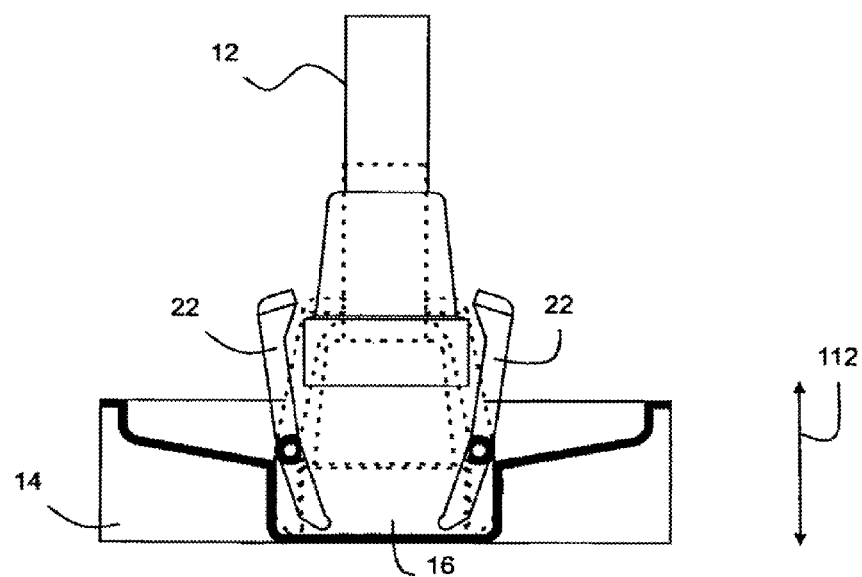

As illustrated in FIGS. 8a and 8b, the advantageous holding mechanism provided by the crutch holder 10 allows for insertion of a crutch without having to lift the crutch a substantial distance. In this embodiment, the crutch 12 only needs to be lifted a distance 112 of say 40 mm to insert the crutch 12. To remove the crutch 12 it is also possible to lift the crutch 12 by 40 mm and move the crutch 12 slightly side to side to quickly urge all of the holding elements 22 back to their retracted positions.

Figure 9A:
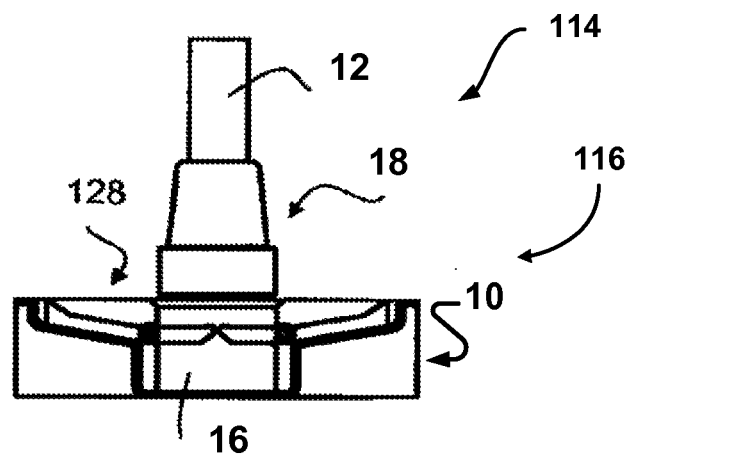
FIGS. 9a-9c provide an illustrative view of a method according to an embodiment of the present invention.
Figure 9B:
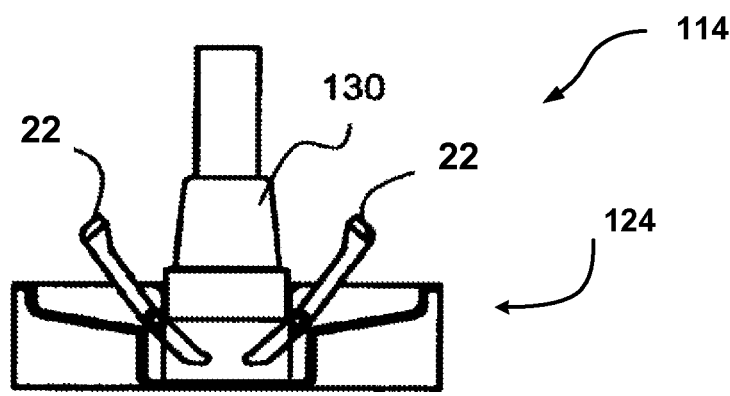
Figure 9C:
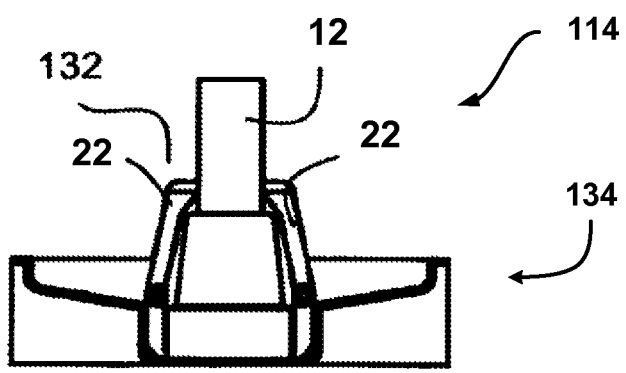
Figure 10:
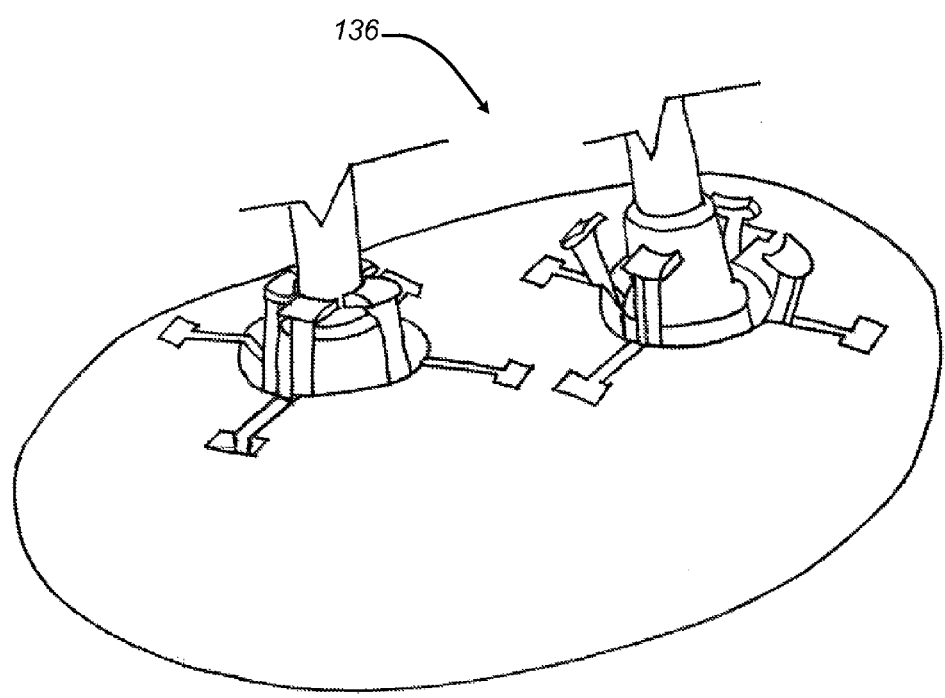
FIGS. 10, 11a, 11b, 11c, and 11d illustrate another crutch holder according to a further preferred embodiment of the present invention.
Figures 11A, 11B, 11C, 11D:
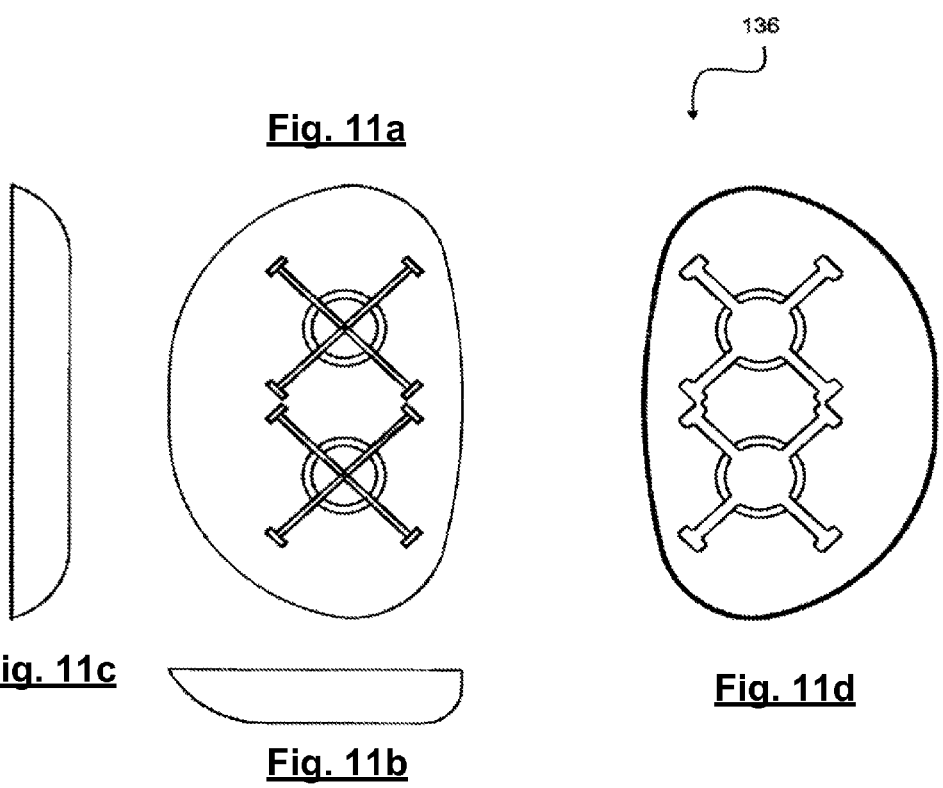
Figure 12:
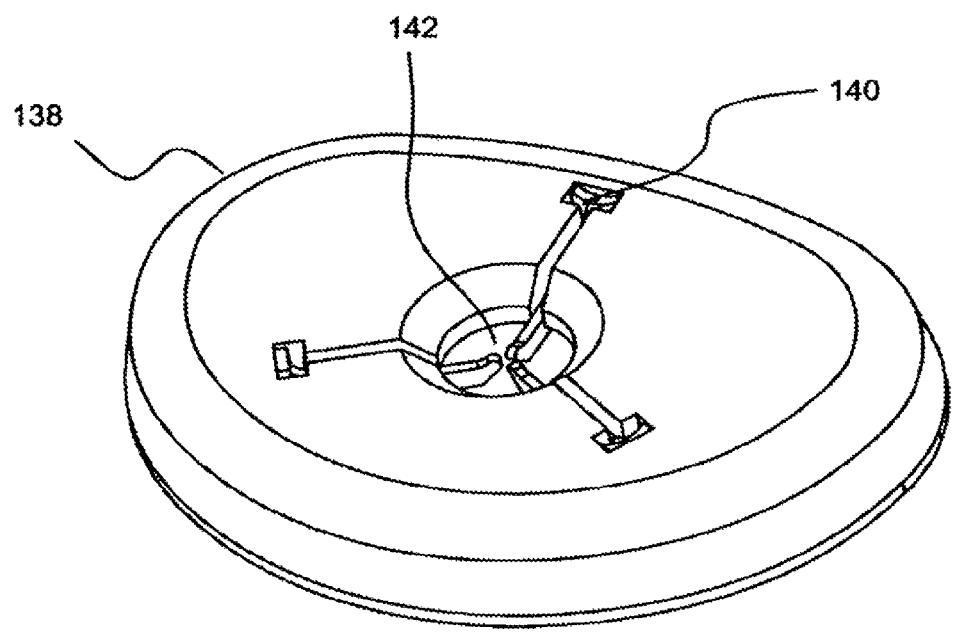
FIG. 12 illustrates yet another crutch holder according to a further preferred embodiment of the present invention.

FIGS. 9a-9c illustrates a method 114 according to a further preferred embodiment of the present invention. At block 116, the method 114 comprises receiving the end 18 of a crutch 12 within a cavity 16 of a crutch holder 10. At block 124, movement of the crutch 12 into the cavity 16 causes the crutch 12 to bear against a plurality of holding elements 22 and move the holding elements 22 from a first condition 128. As shown in FIG. 5 the holding elements 22 move upwardly to an intermediate position in which the holding elements 22 bear against a rubber end 130 of the crutch 12. The holding elements then move along the rubber end 130 to finally bear against the crutch 20 at a position 132 above the rubber end 130. When the crutch 12 is tipped, the holding elements 22 advantageously provide a compressing action at the base of the rubber end 130 that assists with maintaining the crutch 12 in an upright position. At block 134, the method 114 advantageously holds the crutch 12 upright due to the weight of the crutch 12 providing a natural tipping action.

If one considers the depth of the cavity 16, the provision of the holding elements 22 advantageously serves to increase the effective depth of the cavity 16 as seen by the crutch 12. Furthermore by engaging the crutch 12 above the rubber end 130, very slight tipping results in relatively large compression force to hold the crutch 12 in position by the advantageous lever action provided.

FIGS. 10, 11a, 11b, 11c, and 11d show a crutch holder 136 according to yet another preferred embodiment of the present invention. The crutch holder 136 is considered to advantageously sit unobtrusively at floor level while holding a pair of crutches in an upright position ready for use.

The crutch holder 136 provides an elliptical-type plastic dome measuring 320 mm in length by 220 mm wide and is 40 mm at its thickest point which tapers down to floor level at its edge. The dome has two side by side cavities to accommodate the pair of crutches. Each of the cavities holds a mechanism that serves to hold the crutches in place.

Locking arms of the mechanism are activated as a crutch base enters the cavity and locks using the weight of the crutch around the aluminium tube of the crutch, above the rubber grip.

As the crutch reaches full insertion, the locking arms hold the crutch in a vertical position ready for use. To release and extract the crutches, the crutches are simply lifted out of cavities and the locking arms retract and disappear back into the housing of the dome.

The crutch holder 136 is considered to provide a medical healthcare aid in which to stand a pair of crutches. Crutches are a hazard and an inconvenience when not in actual use. Use of the crutch holder 136 in professional settings such as hospital rooms next to beds or chairs, bathrooms, rehabilitation rooms and gyms, waiting rooms and so forth is considered to reduce the nursing and manpower. Importantly, the crutch holder 136 is also considered to provide those who use crutches with more independence.

The crutch holder 136 may also be used domestically by being positioned at bedside, in the bathroom, next to the dining room chair, the television chair, or out on the deck and so forth. Use domestically should provide relief to carers and to give those who use crutches back some independence. As would be apparent the crutch holder 136 should also find application in commercial premises such as workplaces, restaurants, beauty salons and waiting rooms—only to mention a few applications.

From a safety and convenience viewpoint, the crutch holder 136 advantageously provides crutches standing ready for the patient to slip their arms into and not, in the usual position, propped up in the nearest corner or laying dangerously on the floor.

FIG. 15 illustrates a further preferred embodiment of the present invention in the form of a crutch holder 138, for a single crutch or walking cane. The crutch holder 138 includes three holding elements 140 and a recess 142 for receiving a crutch. The holding elements 140 are angularly disposed at about 120 degrees relative to the centre of the recess 142. The holding elements 140 are movable from a reclined position to an extended position in which the holding elements 140 are adapted to prevent tipping of the crutch by applying a clamping action.

In order to provide the clamping action, the holding elements are pivotally mounted to the body of the crutch holder 138 a set distance above the bottom of the recess 142. When in the extended position the first ends of the holding elements 140 hold the shaft of the crutch at three points and second opposite ends of the holding elements 140 hold the lower end of the shaft to assist with preventing tipping.

It will be appreciated that in embodiment where the crutch holder 138 is for a walking cane, the device is configured to receive and hold a walking cane with dimensions of a 19 mm shaft and 38 mm rubber end.

Having now described several preferred embodiments of the present invention it will be appreciated that these embodiments provide examples of:

(i) Crutch holders that provide advantageous holding mechanisms;

(ii) Crutch holders that are readily able to be used and which provide people who require crutches with more independence in domestic. hospital and other environments;

(iii) Crutch holders that have an aesthetically pleasing profile and that allow for ready insertion and removal of crutches; and (iv) Crutch holders that while providing an advantageous holding mechanism are still readily manufactured with a relatively low number of parts.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', "including" and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The invention claimed is:

1. A crutch holder comprising: a body providing a cavity for receiving an end of a crutch; and a plurality of holding elements pivotably mounted relative to the body and adapted to pivot from a substantially horizontal first position to a substantially vertical second position in response to the end of the crutch making contact with each of the holding elements while being inserted into the cavity so as to assist with maintaining the crutch in an upright position, wherein each of the holding elements includes an elongated member with first and second projecting portions, the first and second projecting portions extending substantially upwardly with respect to the body when the holding elements are in the first position and substantially inwardly with respect to the body and adapted to face the crutch when the holding elements are in the second position, the projecting portions being adapted to bear against and compress a side of the end of the crutch in response to the end of the crutch being fully inserted into the cavity, wherein the first projecting portion of each holding element is adapted to engage the end of the crutch and the second projecting portion of each holding element is adapted to engage the crutch at a predetermined distance away from the end of the crutch.

2. The crutch holder as claimed in claim 1 wherein the holding elements are pivotally mounted such that tipping the crutch holder in a direction of one of the holding elements causes movement of the first projecting portion of the one holding element of the holding elements to force the second projecting portion of the one holding element to move in a direction opposite to the direction of the tipping crutch holder to bring the second projecting portion into increased engagement with the end of the crutch and result in an increased holding force.

3. The crutch holder as claimed in claim 1 wherein each holding element pivots about a pivot point in order to compress the end of the crutch as the crutch is tipped, the cavity providing an abutment to hold the end of the crutch in position to allow for compressing action of each pivot lever.

4. The crutch holder as claimed in claim 1 wherein each holding element is pivotally mounted to the body adjacent a periphery of the cavity so as to be rotatable from the first position to the second position.

5. The crutch holder as claimed in claim 1 wherein the holding elements are adapted to move back to the first position when the crutch is lifted vertically out of the cavity.

6. The crutch holder as claimed in claim 1 wherein the holding elements are counterweighted so as to be biased towards the first position.

7. The crutch holder as claimed in claim 1 wherein the cavity includes slot portions for receiving the holding elements.

8. The crutch holder as claimed in claim 1 wherein each holding element is arranged for holding the crutch above a shoulder of a conventional gripping tip at the end of the crutch.

9. The crutch holder as claimed in claim 1 wherein the plurality of holding elements comprises a first pair of holding elements arranged for preventing rotation of the crutch in a first plane and a second pair of holding elements arranged for preventing rotation of the crutch in a second plane; the second plane being substantially perpendicular to the first plane.

10. The crutch holder as claimed in claim 1 wherein a first portion of the body includes slots for allowing the holding elements to extend upwardly to hold the crutch.

11. The crutch holder as claimed in claim 10 wherein the slots of the first portion are of a cruciform configuration.

12. The crutch holder as claimed in claim 1 wherein the holding elements are each of a length of at least 10 cm.

13. A method of holding a crutch comprising: receiving an end of the crutch within a cavity in a body, the body comprising a plurality of pivotally mounted holding elements, wherein each of the holding elements includes an elongated member, a first projecting portion, and a second projecting portion, wherein movement of the end of the crutch partially into the cavity causes the first projecting portion of each of the holding elements to engage the end of the crutch and wherein movement of the end of the crutch fully into the cavity causes the holding elements to pivot from a substantially horizontal first position to a substantially vertical second position in which the holding elements assist with maintaining the crutch in an upright position, wherein the first projecting portions and second projecting portions extend substantially upwardly with respect to the body when the holding elements are in the first position and substantially inwardly with respect to the body and adapted to face the crutch when the holding elements are in the second position, and wherein the first projecting portion of each holding element is adapted to engage the end of the crutch and the second projecting portion of each holding element is adapted to engage the crutch at a predetermined distance away from the end of the crutch when the holding elements are in the second position.

14. The method as claimed in claim 13 wherein each of the holding elements is arranged to extend upwardly when holding the crutch so as to increase the effective depth of the cavity.

15. The method as claimed in claim 13 wherein each of the holding elements is arranged to extend into a horizontal cross section of the cavity so as to decrease the effective width of the cavity.

16. A holder for a rod element comprising: a body with a cavity for receiving an end of the rod element; and a plurality of holding elements adapted to pivot from a substantially horizontal first position to a substantially vertical second position as the rod element makes contact with each of the holding elements while the cavity receives the rod element so as to assist with maintaining the rod element in an upright position, wherein each of the holding elements includes an elongated member with a first projecting portion and a second projecting portion, the first and second projecting portions extending substantially vertically with respect to the body when the holding elements are in the first position and substantially horizontally with respect to the body and adapted to face the crutch when the holding elements are in the second position, the first and second projecting portions being adapted to bear against and compress a side of the rod element in response to the end of the rod element being fully inserted into the cavity, wherein the first projecting portion of each holding element is adapted to engage the end of the rod element and the second projecting portion of each holding element is adapted to engage the rod element at a predetermined distance away from the end of the rod element.

17. The holder as claimed in claim 16 wherein each of the holding elements is arranged to extend upwardly when holding the rod element so as to increase the effective depth of the cavity.

18. The holder as claimed in claim 17 wherein each of the holding elements is arranged to extend into a horizontal cross section of the cavity so as to decrease the effective width of the cavity.

* * * * *